United States Patent [19]

Holzmeister et al.

[11] Patent Number: 4,875,296

[45] Date of Patent: Oct. 24, 1989

[54] ANATOMICAL MEASURING DEVICE

[76] Inventors: John P. Holzmeister; June Holzmeister, both of 9810 Blomberg St. SW., Olympia, Wash. 98502

[21] Appl. No.: 538,537

[22] Filed: Oct. 3, 1983

Related U.S. Application Data

[63] Continuation of Ser. No. 285,998, Jul. 23, 1981, abandoned.

[51] Int. Cl.$^4$ ................................................ G01B 3/10
[52] U.S. Cl. ........................................ 33/770; 33/2 R; 33/512
[58] Field of Search ...................... 33/137, 174 D, 179, 33/138, 2 R, 512, 720

[56] References Cited

U.S. PATENT DOCUMENTS

| | | |
|---|---|---|
| 650,389 | 5/1900 | Hatfield .................................. 33/179 |
| 766,911 | 8/1904 | Stemm .................................... 33/179 |
| 846,461 | 3/1907 | Engel ...................................... 33/179 |
| 1,011,628 | 12/1911 | Klein ...................................... 33/179 |
| 1,069,551 | 8/1913 | Ingalls .................................... 33/179 |
| 2,262,664 | 11/1941 | Bresson .................................. 33/179 |
| 4,433,486 | 2/1984 | Muehlenbein .................... 33/179 X |

FOREIGN PATENT DOCUMENTS 955637 4/1964 United Kingdom ............. 33/174 D Primary Examiner—William A. Cuchlinski, Jr.
Attorney, Agent, or Firm—Roy E. Mattern, Jr.

[57] ABSTRACT

An anatomical measuring device for the convenient, quick, and accurate, measuring of the respective circumferences of portions of one's body is provided by attaching a measuring tape, so the zero dimension of the tape is at the zero dimension of an elongated planar finger held handle on the inside planar surface of the handle, then looping the tape about the circumference of a selected portion of one's body guiding the free end of the tape from the outside planar surface down through a transverse slot in the planar handle, guiding the free end of the tape from the inside planar surface back up through another transverse slot spaced from the first transverse slot in the planar handle, thereafter pulling the tape until the tape snugly fits around the selected portion of one's body, and remains frictionally positioned about the elongated planar finger held handle and then reading the circumferential dimension being sought, at the location where the measuring tape bears against the zero dimension of the elongated planar finger held handle.

2 Claims, 1 Drawing Sheet

U.S. Patent  Oct. 24, 1989  4,875,296
FIG. 1
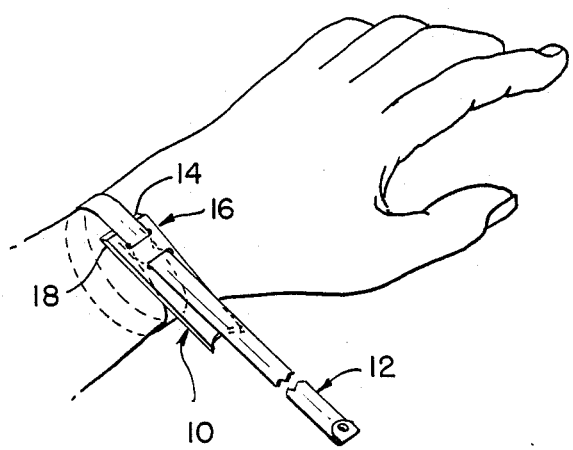
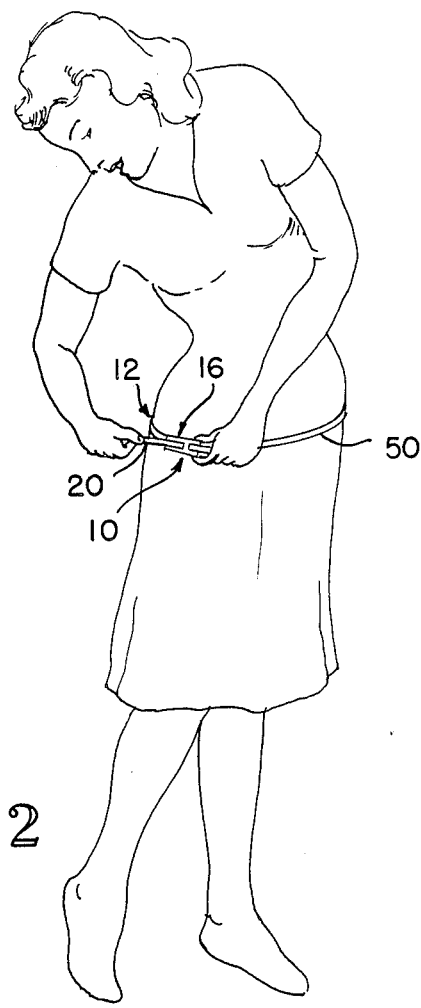
FIG. 2
FIG. 3
FIG. 5
FIG. 4
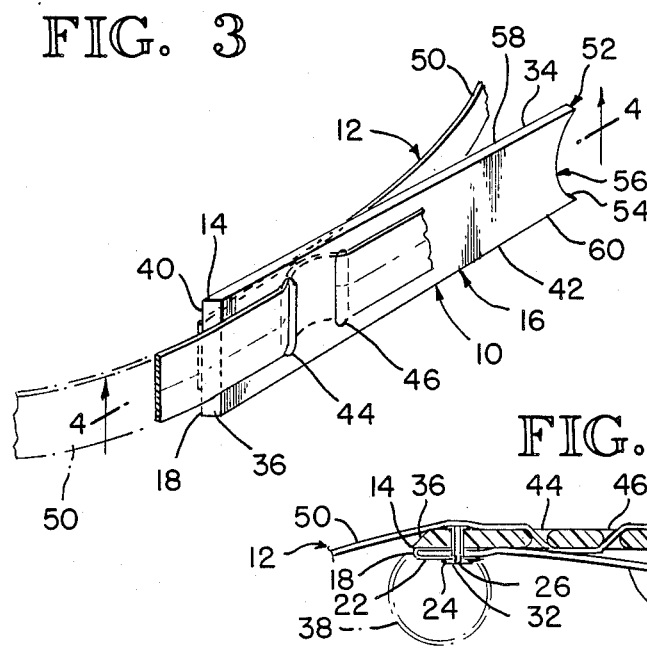

ANATOMICAL MEASURING DEVICE

CROSS REFERENCE TO OTHER APPLICATION

The application is a Continuation, copending with the same applicants' application of same title, Anatomical Measuring Device, of Ser No. 06/285998, filed July 23, 1981, now abandoned and priority of the filing date and disclosure of this first filed copending application is claimed.

BACKGROUND OF INVENTION

When cloth-like, cloth, or plastic measuring tapes, which are readily available today, are used to determine the circumference of portions of one's body, or another's body, from infants to adults in size, it is difficult to accurately hold the measuring tape and to correctly read the dimension being sought. This problem has been recognized for many years and there have been measuring devices presented in prior patents which are considered solutions.

Of these prior patents some have been directed primarily to measuring a person's finger to determine his or her ring size, such as J. B. Ingalls' U.S. Pat. No. 1,069,551 of 1913, wherein a loop of tape, secured to a planar base, was passed around a finger and via slots was pulled along a planar surface on the planar base. A scale was imprinted on this planar surface, and a line on the stopped tape indicated the ring size, then being in alignment with the line on the measuring tape. E. A. Stemm in his 1904 U.S. Pat. No. 766,911 disclosed his finger measuring unit integrally formed of one piece for looping about a finger and being returned down through a slot and then back up through a slot, with the ring size reading being read at the first slot. Gerald Colin in his 1964 British Pat. No. 955,637, illustrated his finger size integral measuring unit having a transverse slot at a wide end to receive its other tapered end, after looping about a finger, with the size being read at the slot.

Other of these prior patents have been directed primarily to measuring larger body portions. Charles B. Hatfield in his U.S. Pat. No. 650,389 in 1900 provided a slotted finger gripped handle to which a cloth measuring tape was looped at its end to a necessarily selected measurement and then sewn back on itself. The free end of the tape after being passed about a person's waist, for example, was guided into an open slot of the finger gripped handle and pulled tight, with the body portion size being read at the slot. Jacob Klein in his U.S. Pat. No. 1,011,628 in 1911, provided an open slot handle to which a cloth measuring tape was pivotally connected to one side portion of the open slot. The free end of the tape, after being passed about a person's waist, for example, was guided back through the open slot and pulled tight, with the body portion size being read at the slot. Gerald L. Bresson in his U.S. Pat. No. 2,262,664 in 1941, illustrated and described his measuring instrument for measuring both the circumference and diameter of round bodies. A limited length finger gripping handle and a cloth measuring tape secured to one side of a slot which then represented the zero dimension. The free end of the tape after passing around a cylinder, for example, would be directed up through the slot and pulled tight. The measurement sought would be read at the side of the slot where the measuring tape was pivotally secured.

Although all of these patents indicated the use of loops of measuring tapes, with one end of the tape being secured at one location on a finger held structure, and arranged for its free end, after passing around a body portion, or an object, to be returned to the finger held structure and drawn tightly, with a reading being taken at a slot location, there remained a need for a comparatively lower cost anatomical measuring device to be more conveniently handled, to be more accurately read, to be more accurately and quickly originally and subsequently equipped with a conventional unaltered measuring tape, which is placed and secured with the zero end of the conventional measuring tape located at the extreme and zero end of a finger held handle, and with no edges of the guiding slots being used as measuring lines or points, and also with an opposite concave end on the finger held handle to align the tape portions being rolled up, when the measuring tape is compacted for temporary carrying and storing.

Moreover, there was a need for a measuring tape which would be manipulated with one hand, and when the tape was pulled tight it would frictionally hold the correct dimension, so the tailor could use his or her other hand to record the dimension. In addition the tailor subsequently could use the tape, without looping it, for inseam measurements, and any other linear planar measurements.

SUMMARY OF THE INVENTION

An anatomical measuring device is provided for quickly, accurately, and conveniently measuring the respective sizes of body portions. Conventional and readily available, cloth, cloth-like, or plastic, measuring tapes, without alterations in length, are quickly attached to a planar finger held handle, preferably made of plastic, with the tape zero dimension being at the beveled end serving as the zero end of the finger held handle.

Moreover with the tape frictionally held to hold the accurate measurement, then a tailor may use his or her free hand to record the measurement. Yet at any time a linear, planar measurement is to be made of an inseam or during a layout of material the loop is pulled out and the tape becomes a conventional use measuring tape. The beveled end is then used as the transverse line or place of reading the dimension being sought, as the measuring tape, after being looped about a body portion is drawn tightly and thereafter frictionally held. The measuring tape is so frictionally held because previously its free end had been passed down through one slot and back up through a spaced apart slot, which are both provided along the planar finger held handle. A concave contoured end is opposite the beveled end of the planar finger held handle. When the anatomical measuring device is to be folded up for handling and/or storing, the measuring tape is folded lengthwise about the planar finger held handle, with the folds being aligned, positioned and held, via the use of this concave contoured end.

DESCRIPTION OF THE DRAWINGS

A preferred embodiment of the anatomical measuring device is illustrated in the drawings, wherein:

FIGS. 1 and 2 are perspective views of the anatomical measuring device being used to measure respectively, one's wrist and one's waist;

FIG. 3 is an enlarged partial perspective view of the anatomical measuring device to show how the measuring tape at its zero dimension is secured to the inside of the planar finger held handle, and the free tape is frictionally threaded down into a slot and back up through a spaced slot, as viewed from the outside of the planar finger held handle, having the concave end to guide and to position the rolls of the measuring tape when it is not in use;

FIG. 4 is an enlarged partial sectional view, taken along line 4—4 of FIG. 3, showing how the starting end of the measuring tape is snapped into place with its leading zero edge being located at the commencement of the leading beveled edge end, i.e. the zero end, of the planar finger held handle; and FIG. 5 is an enlarged partial view of the measuring tape and its indicia tightly pulled over the beveled edge end of the planar finger held handle, showing how accurately, and conveniently, the dimension being sought is read at the transverse leading edge, i.e. the zero end, of this beveled edge end as the tape is firmly and frictionally held, so a tailor or a person may use one of his or her hands to record the dimension.

DESCRIPTION OF THE PREFERRED EMBODIMENT

The preferred embodiment of the antomical measuring device 10 is illustrated throughout the drawings. As shown in FIGS. 1 and 2, it is used in measuring the circumference of portions of one's body or another's body, such as one's wrist or waist. Also it has been found to be very useful in measuring newborn babies.

This anatomical measuring device 10 is conveniently and accurately used, with the correct measurement being clearly observed by reading the measuring tape 12 without any obstruction, or possible shadow, as the zero end 14 of a finger held handle 16 is positioned directly below measuring tape 12, when the measurement sought is being read, as illustrated in FIGS. 3, 4, and 5. The cloth, cloth-like, or plastic measuring tape 12 is selectable from many being offered by several manufacturers. The respective ends 18, designated as the zero end, and 20, designated as the free end, of these measurement tapes 12 come with a folded over metal end 22, which is secured by a hollow rivet 24, providing a receiving hole 26. These metal ends 22, respectively encompassing the zero end 18 and free end 20 determine and maintain the zero and maximum dimensions of the scales, English 28 and Metric 30, printed on both sides of the measuring tape 12.

As shown in FIG. 4, a protruding button 32 is provided at the inside planar surface 34 of the finger held handle 16. This button 32 is surrounded by the receiving hole 26 in the hollow rivet 24, upon the completion of snapping the zero end 18 of the measuring tape 12 into place, with its zero end 18 being transversely aligned and adjacent to the zero end 14, or leading edge 14, of the finger held handle 16. Although the use of this protruding button 32 is preferred so a new measuring tape 12 may be quickly exchanged for a worn tape 12 or a different length tape 12, other more permanent securement options are available. For example no protruding button 32 would be provided, but a hole, now shown, would be formed in the finger held handle, as well as a hole, not directly shown, would be formed in the measuring tape 12, and then the hollow rivet 24 would be passed through both these holes before being riveted, to thereby secure the measuring tape 12 to the finger held handle 16. Also the resepctive zero ends 14, 18 and nearby portions of both the finger held handle 16 and measuring tape 12 could be secured together by using an adhesive. However, these zero ends 14, 18 may be secured together, for clearer reading of the measurement being sought, the finger held handle 16 has a beveled surface 26 at this zero end 14, as illustrated in FIGS. 3, 4, and 5.

As schematically indicated by the dotted circle 38 in FIG. 4, the measuring tape 12 is wrapped around in a circle or loop configuration 38, when being used to determine a size. The zero end 18 of the measuring tape 12 and the zero end 14 of the finger held handle 16 are at the commencement 40 of the inside planar surface 34 of the finger held handle 16. After the free end 20 of the measuring tape 12 is returned to the finger held handle 16, it is initially passed over the outside planar surface 42 of the finger held handle, likewise passing over the beveled surface 36. Shortly thereafter, at a spaced distance from the zero end 14 of the finger held handle 16 and likewise also at the same spaced distance from the zero end 18 of the measuring tape 12, the free end 20 of the tape 12 is threaded down through a first transverse slot 44 in the finger held handle 16. Soon thereafter, at a short spaced distance from the first transverse slot 44, the free end 20 of the measuring tape 12 is threaded back up through a second transverse slot 46, and then pulled along the outside planar surface 42, until the measuring tape 12 becomes well fitted about the body portion being measured. Once in this fitted position, the size measurement being sought, is easily and accurately read at the respective transverse scale line 48, which is then positioned opposite the zero ends, 14 and 18 respectively of the finger held handle 16 and measuring tape 12.

The tape is generally held sufficiently via the frictional forces, and one hand of the user or tailor is used to record the dimension via a pencil on a piece of paper. When a slight finger pressure is used at this time to hold the measuring tape 12 against the finger held handle 16, the accuracy of the measurement is further insured.

The threading of the measuring tape 12 through the respective first and second spaced transverse slots 44, 46, serves to align, to guide, and to frictionally restrain the measuring tape 12 to aid in the overall use of the anatomical measuring device 10. During its use, the loop configuration 38 is often maintained and preadjusted, and then the loop portion 50 of a pre-selective diameter is conveniently passed over a body portion and subsequently drawn tight. Thereafter, a dimension reading is quickly, conveniently, and accurately made. Thereafter, the loop portion 50 is enlarged and slipped off the body portion. For obtaining possibly less accurate measurements, the measuring tape 12 is read, without first threading the free end 20 through the first and second transverse slots 44, 46.

When the measuring tape is free of the first and second transverse slots 44, 46, it may be used in measuring inseams, and it may be used in making all measurements made by using a conventional tape.

Whenever the anatomical measuring device 10 is to be temporarily stored, the measuring tape 12 is preferably wrapped lengthwise about the finger held handle 16. Such wrapping may be undertaken whether or not the free end 20 of the measuring tape 12 has been threaded through the first and second transverse slots 44, 46. To assist in keeping the lengthwise wrapped and looped measuring tape 12 in place, the terminating end 52 of the finger held handle 16 is formed with an arcuate concave surface 54, thereby providing a recess 56 into which the respective then folded portions of the measuring tape 12 are positioned and held against transverse movement. As so arranged, a rubber band or string tie, neither being illustrated, are oftentimes placed both the multiple storage loops of tape 12 and the finger held handle 16, to complete the inactive positioning of the components of the anatomical measuring device 10. The finger held handle 16 has longitudinally tapered sides 58, 60 serving to conserve on plastic or other materials utilized during manufacturing, and also to improve the handling characteristics when gripped by a user's fingers.

We claim:

1. An anatomical measuring device primarily used for determining the circumferential size of a body portion, yet being used also for mroe readily determining inseam lengths and other linear lengths, the latter use being similar to the use of a conventional tape, comprising:

a) a finger held handle having a commencing transverse tapered zero measurement end, and a terminating guiding end, an inside planar surface for placement toward a person's body, an outside planar surface for placement away from a person's body, a first transverse slot spaced from the zero measurement end through which a free end of a measuring tape after encircling a body portion and passing over the aero measurement end, may be inserted, commencing from the outside planar surface, and a second transverse slot, spaced from the first transverse slot, through which a free end of the measuring tape may be inserted, after passing through the first transverse slot and along the inside planar surface, commencing from the inside planar surface and thereafter passed over the outside planar surface and drawn in alignment with a finger held handle, until a wanted loop size of a measuring tape is reached about a body portion, and thereafter this loop size about a body portion is maintained by the restraint, which is created by the friction developed, as portions of a measuring tape are then closely positioned through the first and second transverse slots and along the inside planar surface between these spaced transverse slots; and b) a measuring tape having a zero end secured in transverse alignment with the transverse tapered zero measurement end of the finger held handle, adjacent the inside planar surface of the finger held handle, and a free end for directly creating an encircling portion of the tape around a body portion, and the free end for passing directly over the transverse tapered zero measurement end after encircling a body portion, and then for insertion, commencing from the outside planar surface of the finger held handle, through the first transverse slot spaced from the zero measurement end, and continuing for passing closely adjacent the inside planar surface, until reaching the second transverse slot, spaced from the first transverse slot, and continuing for insertion through the second transverse slot, and then continuing along the outside planar surface until reaching and passing the terminating end of the finger held handle, and remaining pullable until an encircling dimension around a body portion is finally determined, and then remaining stationary under the friction force, while the measurement is easily read, where the portions of the tape pass over the zero measurement ends of both the measuring tape and the finger held handle, so the size measurement being sought is easily observed in respect to the transverse portion of the measuring tape, then located in transverse alignment with both these respective zero measurement ends of the measuring tape and the finger handle.

2. An anatomical measuring device primarily used for determining the circumferential size of a body portion, yet being used also for more readily determining an inseam length for pants and for determining other linear lengths, the latter use being similar to the use of a conventional tape, comprising:

a) an elongated rectangular finger held handle of substantial constant rectangular cross section between its ends having a commencing completely transverse tapered zero measurement end and a terminating completely transverse guiding end, an inside completely planar surface for placement toward a person's body, an outside completely planar surface for placement away from a person's body, a first transverse slot spaced from the zero measurement end through which a free end of a measuring tape, after encircling a body portion, and passing over the zero measurement end, may be inserted, commencing from the outside planar surface, and a second transverse slot, spaced from the first transverse slot, through which a free end of the measuring tape may be inserted, after passing through the first transverse slot and along the inside planar surface, commencing from the inside planar surface and thereafter passed over the outside planar surface and drawning alingment with a finger held handle, until a wanted loop size of a measuring tape is reached about a body portion, and thereafter this loop size about a body portion is maintained by the restraint, which is created by the friction developed, as portions of a measuring tape are then closely positioned through the first and second transverse slots and along the inside planar surface between these spaced transverse slots; and b) a measuring tape having a zero end secured in transverse alignment with the transverse tapered zero measurement end of the finger held handle, adjacent the inside planar surface of the finger held handle, and a free end for directly creating an encircling portion of the tape around a body portion, and the free end for passing directly over the transverse tapered zero measurement end after encircling a body portion, and then for insertion, commencing from the outside planar surface of the finger held handle, through the first transverse slot spaced from the zero measurement end, and continuing for passing closely adjacent the inside planar surface, until reaching the second transverse slot, spaced from the first transverse slot, and continuing for insertion through the second transverse slot, and then continuing along the outside planar surface until reaching and passing the terminating end of the finger held handle, and remaining pullable until an encircling dimension around a body portion is finally determined, and then remaining stationary under the friction force, while the measurement is easily read, where the portions of the tape pass over the zero ends of both the measuring tape and the finger held handle, so the size measurement being sought is easily observed in respect to the transverse portion of the measuring tape, then located in transverse alignment with both these respective zero measurement ends of the measuring tape and the finger handle.

* * * * *